3,043,797
STABILIZED POLY-α-OLEFIN COMPOSITIONS
John William Addleburg, Gerald R. Lappin, and Ben P.
Rouse, Jr., Kingsport, Tenn., assignors to Eastman
Kodak Company, Rochester, N.Y., a corporation of
New Jersey
No Drawing. Filed Nov. 21, 1958, Ser. No. 775,336
10 Claims. (Cl. 260—45.85)

This invention relates to the stabilization of poly-α-olefin compositions. Preferred embodiments of the invention relate to the stabilization of polyethylene and polypropylene compositions against deterioration resulting from exposure to sunlight or ultraviolet light.

Poly-α-olefins, such as polyethylene, polypropylene and the like, are subject to photo-oxidation when exposed to sunlight or ultraviolet light. This oxidation in poly-α-olefins is characterized in its earlier stages by the breaking of the polymer chain and the formation of carbonyl groups in the molecule with a resultant deleterious effect on the electrical properties of the polymer. As the oxidation continues, poly-α-olefins crack and lose tensile strength to the point of mechanical failure.

A number of so-called ultraviolet inhibitors are known which inhibit the photo-degradation of many polymers, resins or plastics. However, some of the more effective of these known ultraviolet inhibitors are not compatible with such poly-α-olefins as polyethylene in that they either exude therefrom soon after being incorporated therein or are insoluble therewith. Also, there are other known ultraviolet inhibitors that are compatible with such poly-α-olefins as polyethylene but are not entirely satisfactory stabilizers therefor. In addition, many effective stabilizers for chlorine-containing polymers such as polyvinyl chloride, chlorinated polyethylene, polyvinylidene chloride, poly(2,3-dichloro-1,3-butadiene) and the like are not necessarily effective stabilizers for poly-α-olefins as stabilizers in chlorine-containing polymers function essentially as hydrogen chloride scavengers while stabilizers in chlorine-free poly-α-olefins do not serve this function. Similarly, there are certain stabilizers that are eminently suitable as ultraviolet inhibitors in such cellulosic ester plastics as cellulose triacetate, cellulose acetate butyrate and the like that are not particularly effective in poly-α-olefins. Hence, it is highly unpredictable as to whether a given compound will be both compatible with, and a good stabilizer for, poly-α-olefin compositions short of actually testing the compound in poly-α-olefins.

It is an object of this invention to provide new poly-α-olefin compositions of high stability.

It is a further object of this invention to provide novel polyethylene compositions containing additives that are compatible with, and effective stabilizers for, the polyethylene compositions.

It is likewise an object of this invention to provide new polyethylene compositions having improved stability against deterioration resulting from exposure to sunlight or ultraviolet light.

Similarly, it is an object of this invention to provide new polypropylene compositions having improved stability against deterioration resulting from exposure to sunlight or ultraviolet light.

It is also an object of this invention to provide new polyethylene and polypropylene compositions of improved stability in thin film form.

Other objects of this invention will be apparent from the description and claims which follow.

The present invention comprises poly-α-olefin compositions containing dispersed therein a stabilizing amount of alkylphenyl salicylates that can be represented by the following formula:

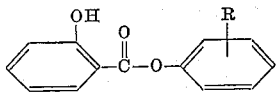

wherein R is an alkyl group having suitably 8 to 15 carbon atoms, desirably 8 to 12 carbon atoms, and preferably 8 carbon atoms. The substituent, R, can be either a straight or a branched chain alkyl group and can be positioned in the ortho, meta or para positions on the phenyl moiety of the subject alkylphenyl salicylates. The para-alkylphenyl salicylates are preferred. Typical compounds of the present invention include the ortho, meta and para isomers of n-octylphenyl salicylate, (1,1,3,3-tetramethylbutyl)phenyl salicylate, (2,2-dimethylhexyl)phenyl salicylate, n-nonylphenyl salicylate, (1,1,3,3-tertamethylamyl)phenyl salicylate (1,1-dimethylheptyl)phenyl salicylate, n-decylphenyl salicylate (2,2-dimethyloctyl)phenyl salicylate, n-dodecylphenyl salicylate, n-tetradecylphenyl salicylate, n-pentadecylphenyl salicylate, and the like. Mixtures of more than one of such alkylphenyl salicylates can also be employed.

The alkylphenyl salicylate stabilizers used in the invention can be readily prepared by reacting salicylic acid and an ester of an alkylphenol containing the desired alkyl radical. In a typical reaction, 1 mole of salicylic acid is reacted with 1 mole of the acetate ester of the alkylphenol at 200–210° C. for three hours in the presence of a small amount of boric acid catalyst. One mole of acetic acid is evolved during the course of the reaction. The resulting reaction product can be used as a stabilizer without purification although the reaction product is desirably purified by either crystallization or vacuum distillation.

Also, the alkylphenyl salicylate stabilizers used in the invention can be prepared by reacting salicylic acid and an alkylphenol. In a typical reaction, 1.5 moles of salicylic acid is refluxed with 1.0 mole of the alkylphenol in 1 liter of substantially dry benzene in the presence of 0.33 mole of phosphorous oxychloride for 6 to 12 hours. After cooling the resulting reaction mixture, water is added to destroy remaining phosphorous oxychloride and the mixture is diluted with 500 ml. of isopropyl ether. The isopropyl ether solution is washed with water and aqueous sodium bicarbonate, and the isopropyl ether thereafter is removed by vacuum distillation. The resulting alkylphenyl salicylate product can be used as a stabilizer for poly-α-olefins or it can be further purified by crystallization from a solvent such as isopropyl ether or by further vacuum distillation.

The alkylphenyl salicylates described herein can be used to stabilize a wide variety of poly-α-olefin compositions against deterioration resulting from exposure to ultraviolet light. Any of the normally solid poly-α-olefins prepared from α-monoolefinic aliphatic hydrocarbons having from 2 to 10 carbon atoms can be stabilized in accordance with the invention. The subject stabilizers are preferably used in polyethylene and polypropylene although such poly-α-olefins such as poly 4-methylpentene-1, poly 3-methylbutene-1, poly 3,3-dimethylbutene-1, polypentene-1, poly 4-methylpentene-1, and the like are included in the present invention. Reference is made to Fawcett et al. U.S. Patent No. 2,153,553, granted April 11, 1939, and to copending applications by Coover, U.S. Serial No. 559,536 filed January 17, 1956, now abandoned, and Coover et al. U.S. Serial No. 724,904, filed March 31, 1958, now abandoned, with regard to the preparation of various poly-α-olefin compositions that can be stabilized with the subject stabilizers. The subject stabilizers are more usually used to stabilize the more common solid resinous poly-α-olefin compositions having average molecular weights of at least about 15,000 and usually at least 20,000. These stabilizers likewise can be used to stabilize the so-called poly-α-olefin waxes having lower molecular weights.

The amount of the present stabilizer employed in poly-α-olefin compositions can be widely varied, the stabilizing amount used varying with the particular poly-α-olefin composition and the use to which the poly-α-olefin is to be put. Concentrations of stabilizer of at least 0.1% are suitably used, with concentrations of 0.1% to 10% being more generally used, with concentrations of 0.5% to 5% and often times 0.5% to 2.5% being preferably used, the concentrations of stabilizer being based on the weight of the poly-α-olefin.

The stabilizers of the invention can be incorporated or blended into poly-α-olefins by any of the conventional methods used for blending related materials into plastics or resins. Typical of such methods that can be suitably employed include milling on heated rolls, deposition from solvents, and dry blending. The subject stabilizers are compatible with poly-α-olefins in the stabilizing amounts employed and thus can be readily incorporated therein.

The alkylphenyl salicylate stabilizers of the invention lend to poly-α-olefins improved stability, and more specifically, improved stability against deterioration resulting from exposure to ultraviolet light, sunlight and outdoor weathering. Thus, poly-α-olefins stabilized in accordance with the invention have an extended life expentency and can be used more effectively than unstabilized poly-α-olefins for a wide diversity of uses, including outdoor uses requiring prolonged exposure to the elements. Poly-α-olefins stabilized in accordance with the invention can be cast, extruded or molded into sheets, rods, tubes, piping, filaments and other shaped articles. The present compositions can also be used for coating paper, wire, metal foil, glass fiber, synthetic and natural textiles and other such materials. As the subject stabilizers do not exude from poly-α-olefins in objectionable amounts as do many stabilizers, the subject stabilizers can be effectively used to stabilize thin films or sheets of the polymer 0.5 to 100 mils in thickness, for example.

The invention is illustrated by the following examples describing preferred embodiments thereof.

EXAMPLE 1

Typical representatives of the present higher alkylphenyl salicylates were compared with typical lower alkylphenyl salicylates as stabilizers for polyethylene in accordance with an A.S.T.M. standard test, designated specifically as A.S.T.M. D795-49. The A.S.T.M. standard test in general comprises exposing the test samples of polyethylene in an artificial weathering device and evaluating the effect visually. The artificial weathering device employed was an Atlas Twin-Arc Weather-Ometer of the type described in Anal. Chem. 25, 460 (1953), that was modified by the addition of 10 Westinghouse 20 watt fluorescent sun lamps. The polyethylene employed had a molecular weight of about 30,000 and a density of about 0.92. The additives were incorporated into the polyethylene at a concentration of 1% by weight based on the polyethylene by milling on heated rollers in accordance with usual practice. Thereafter, the polyethylene was compression molded into sheets 60 mils thick. Table 1 set out below summarizes the results of the weathering test.

Table 1

| Additive | Hours to Failure |
| --- | --- |
| None | 200 |
| p-tert.-butylphenyl salicylate | 392 |
| p-tert.-amylphenyl salicylate | 540 |
| p-tert.-octylphenyl salicylate [1] | 1,045 |
| p-tert.-nonylphenyl salicylate [2] | 1,100 |

[1] p-(1,1,3,3-tetramethylbutyl) phenyl salicylate.
[2] Prepared by reacting a mixture of a commercial p-tert.-nonylphenol with salicylic acid (B.P. 184°–190° at 5 mm. of mercury).

As can be seen from the data in Table 1, polyethylene having incorporated therein the higher alkylphenyl salicylates of the present invention have significantly improved stability over polyethylene having incorporated therein the closely related lower alkylphenyl salicylates. All of the alkylphenyl salicylates set out in Table 1 were compatible with the polyethylene samples and did not exude therefrom during the testing.

EXAMPLE 2

Polyethylene samples containing several of the alkylphenyl salicylates of the invention were subjected to an outdoor weathering test. Polyethylene samples containing phenyl salicylate and no additive were included in the test. The various additives were incorporated into polyethylene having a molecular weight of about 30,000 and a density of about 0.92 at a concentration of 1% by weight based on the polyethylene by milling on heated rollers in accordance with usual practice. Thereafter, the polyethylene was compression molded into sheets 60 mils thick. Samples of the resulting sheets containing the various additives and the control sample containing no additive were exposed to outdoor weathering on a rack facing south at an angle with the horizontal of 36.5° at Kingsport, Tennessee. The carbonyl content of the various samples was determined before exposure and after 10 weeks' exposure by measurement of the infrared absorption in the 5.82 m$\mu$ region. The determination of the carbonyl increase in poly-α-olefins gives an early and reliable indication of photo-oxidation thereof. The carbonyl increase in the resulting samples is set out in Table 2 below. Reference is made to the following two publications concerning the determination of carbonyl content by infrared measurements: Rugg, Smith and Bacon, J. Polymer Sci., 13, 535 (1954), and Cross, Richards and Willis, Discussions, Faraday Soc., No. 9, 235 (1950).

Table 2

| Additive | Carbonyl Unit Increase After 10 Weeks |
| --- | --- |
| None | 16.8 |
| phenyl salicylate | 6.6 |
| o-n-octylphenyl salicylate | 0 |
| p-tert.-octylphenyl salicylate [1] | 0 |
| o-n-dodecylphenyl salicylate | 0 |
| p-n-dodecylphenyl salicylate | 0 |
| m-n-pentadecylphenyl salicylate | 0 |

[1] p-(1,1,3,3-tetramethylbutyl)phenyl salicylate.

The data in Table 2 points up the fact that the alkylphenyl salicylates of the present invention are significantly better than phenyl salicylate as stabilizers for polyethylene against deterioration resulting from exposure to sunlight. Similar enhanced stability is also demonstrated when 1% by weight of the higher alkylphenyl salicylates described in Table 2 are incorporated and tested as described in other poly-α-olefins such as polypropylene, poly 4-methylpentene-1, poly 3-methylbutene-1, poly 3,3-dimethylbutene-1, poly pentene-1 and poly 4-methylpentene-1. The phenyl salicylate and all of the alkylphenyl salicylates set out in Table 2 were compatible with the poly-α-olefin samples and did not exude therefrom during the course of the weathering test.

EXAMPLE 3

An outdoor weathering test as described in Example 2 was used to test and compare the effectiveness of higher alkylphenyl salicylates with phenyl salicylate as stabilizers for "high density" polyethylene. The polyethylene employed had a molecular weight of about 30,000 and a density of 0.945. The additives were incorporated into the polyethylene at a concentration of 1% by weight based on the polyethylene by milling on heated rollers in accordance with usual practice. Thereafter, the polyethylene was compression molded into sheets 1/16 inch thick. A polyethylene sample containing no additive was included in the test. The results of the test are set out in Table 3 below.

*Table 3*

| Additive | Carbonyl Unit Increase After 10 Weeks |
| --- | --- |
| None | 17 |
| phenyl salicylate | 7 |
| o-n-octylphenyl salicylate | 0 |
| o-n-dodecylphenyl salicylate | 0 |

As can be observed from the data in Table 3, the alkylphenyl salicylates of the present invention are effective for stabilizing "high density" polyethylene against deterioration resulting from exposure to sunlight. All of the additives set out in Table 3 were compatible with the polyethylene samples and did not exude therefrom during the course of the weathering test.

EXAMPLE 4

Polyethylene samples having a molecular weight of about 30,000 and a density of 0.945 were prepared in the form of 5 mil thick films, 2½ by ½ inch in size, with 1% by weight of p-tert.-butylphenyl salicylate and 1% by weight of o-n-octylphenyl salicylate incorporated in separate samples thereof. These films, together with a film containing no additive, were exposed for 410 hours in an artificial weathering device such as is described in Example 1. The exposed films were tested for deterioration resulting from the artificial weathering by elongation measurements on an Instron tensile tester at a rate of stretch of 2000% per minute. The films were conditioned 3 days at 73° F. at a relative humidity of 50% before testing. The results of the test are summarized by the data set out in Table 4 below.

*Table 4*

| Additive | Percent of Original Elongation Retained After 410 Hours of Exposure |
| --- | --- |
| None | 12 |
| p-tert.-butylphenyl salicylate | 38 |
| o-n-octylphenyl salicylate | 73 |

As determined from the elongation measurements described above, o-n-octylphenyl salicylate of the present invention is almost twice as effective as p-tert.-butylphenyl salicylate for stabilizing "high density" polyethylene against deterioration resulting from exposure to ultraviolet light. The additives did not exude from the polyethylene samples during the course of the testing.

EXAMPLE 5

Several typical higher alkylphenyl salicylates of the invention were incorporated into polypropylene having an average molecular weight of about 110,000 and a density of 0.917 at a 5% by weight level by milling on heated rollers in accordance with usual practice, and thereafter 2 mil-thick films were prepared therefrom. Samples of these films as well as comparable polypropylene film samples containing no stabilizer additive and 5% by weight of phenyl salicylate for comparative purposes were exposed to ultraviolet light in an artificial weathering device such as is described in Example 1. The various samples were periodically observed and the hours of exposure until brittleness in the samples developed was recorded.

The data set out in Table 5 below summarizes the results of the artificial weathering test.

*Table 5*

| Additive | Hours to Brittleness |
| --- | --- |
| None | 46 |
| Phenyl salicylate | 46 |
| o-n-Octylphenyl salicylate | 358 |
| p-n-Octylphenyl salicylate | 387 |
| p-tert.-Octylphenyl salicylate [1] | 390 |

[1] p-(1,1,3,3-tetramethylbutyl)phenyl salicylate.

As can be observed from the data set out in Table 5, the subject higher alkylphenyl salicylates substantially enhance the resistance of polypropylene to deterioration resulting from ultraviolet light. Similar enhanced stability is also demonstrated when 5% by weight of the octylphenyl salicylates described in Table 5 are incorporated in and tested as described in other poly-α-olefins such as polyethylene, poly 4-methylpentene-1, poly 3-methylbutene-1, poly 3,3-dimethylbutene-1, poly pentene-1 and poly 4-methylpentene-1. The additives did not exude from the polypropylene during the course of the testing.

EXAMPLE 6

Samples of polypropylene having an average molecular weight of about 110,000 and a density of 0.917 containing 1% by weight of one of phenyl salicylate and p-(1,1,3,3-tetramethylbutyl)phenyl salicylate incorporated therein by milling on heated rolls were extruded into sheets 20 mils thick and thereafter cut into 2½ by ½ inch samples. Like polypropylene samples containing no additives were prepared. The prepared samples were exposed for varying lengths of time to ultraviolet light in an artificial weathering device such as described in Example 1. Exposure damage to the samples of polypropylene was observed with respect to change of flexural strength and inherent viscosity, the results being summarized by the data in Table 6 below.

*Table 6*

| Additive | Percent Initial Flexural Strength Left After 450 Hours' Exposure | Percent Initial Inherent Viscosity Left After 95 Hours' Exposure |
| --- | --- | --- |
| None | 0 | 23 |
| Phenyl salicylate | 10 | 28 |
| p-(1,1,3,3-Tetramethylbutyl) phenyl salicylate | 40 | 85 |

The flexural strength data set out in Table 6 was determined by the Tour-Marshall test (A.S.T.M. D747–43), and the inherent viscosity data set out in Table 6 was a measurement of inherent viscosity of tetralin solutions, 0.25 g. of polymer per 100 cc. at 145° C. being used.

Thus, the present invention provides poly-α-olefin compositions of improved stability—particularly improved stability against deterioration resulting from exposure to ultraviolet light or outdoor weathering.

Although the invention has been described in considerable detail with reference to certain preferred embodiments thereof, it will be understood that variations and modifications can be effected within the spirit and scope of the invention as described hereinabove and as defined in the appended claims.

This application is a continuation-in-part of our copending application, U.S. Serial No. 697,523, filed November 20, 1957, now abandoned.

We claim:
1. A solid poly-α-olefin composition comprising a solid poly-α-olefin prepared from an α-monoolefinic aliphatic hydrocarbon having 2 to 6 carbon atoms contained dis- persed therein 0.1% to 10% by weight based on said poly-α-olefin of a stabilizer having the following formula:

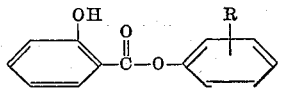

wherein R is an alkyl group having 8 carbon atoms.

2. A solid poly-α-olefin composition comprising a solid poly-α-olefin selected from the group consisting of polyethylene and polypropylene containing dispersed therein 0.1% to 10% by weight based on said poly-α-olefin of a stabilizer having the following formula:

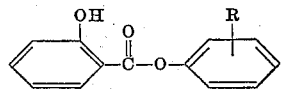

wherein R is an alkyl group having 8 carbon atoms.

3. A solid polyethylene composition comprising solid polyethylene containing dispersed therein 0.1% to 10% by weight based on said polyethylene of p-(1,1,3,3-tetramethylbutyl)phenyl salicylate.

4. A solid polypropylene composition comprising solid polypropylene containing dispersed therein 0.1% to 10% by weight based on said polypropylene of p-(1,1,3,3-tetramethylbutyl)phenyl salicylate.

5. A solid polyethylene composition comprising solid polyethylene containing dispersed therein 0.5% to 5% by weight based on said polyethylene of p-(1,1,3,3-tetramethylbutyl)phenyl salicylate.

6. A solid polyethylene composition comprising solid polyethylene containing dispersed therein 0.5% to 5% by weight based on said polyethylene of o-n-octylphenyl salicylate.

7. A solid polypropylene composition comprising solid polypropylene containing dispersed therein 0.5% to 5% by weight based on said polypropylene of p-(1,1,3,3-tetramethylbutyl)phenyl salicylate.

8. A solid polypropylene composition comprising solid polypropylene containing dispersed therein 0.5% to 5% by weight based on said polypropylene of o-n-octylphenyl salicylate.

9. A solid polypropylene composition comprising solid polypropylene containing dispersed therein 0.5% to 5% by weight based on said polypropylene of p-n-octylphenyl salicylate.

10. A solid poly-α-olefin composition comprising a solid poly-α-olefin selected from the group consisting of polyethylene and polypropylene in film form 0.5 to 100 mils in thickness containing dispersed therein 0.5% to 5% by weight based on said poly-α-olefin of a stabilizer having the following formula:

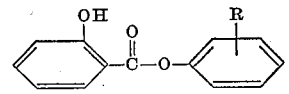

wherein R is an alkyl group having 8 carbon atoms.

References Cited in the file of this patent
UNITED STATES PATENTS

| | | |
|---|---|---|
| 2,448,799 | Happoldt et al. | Sept. 7, 1948 |
| 2,514,216 | Stefl | July 4, 1950 |
| 2,843,577 | Friedlander et al. | July 15, 1958 |
| 2,859,194 | Reid et al. | Nov. 4, 1958 |
| 2,925,400 | Tholstrup et al. | Feb. 16, 1960 |